Jan. 21, 1964  P. F. McADAMS  3,118,686
BOUNCE RETARDING VEHICLE SUSPENSION
Filed Dec. 29, 1960  5 Sheets-Sheet 1

INVENTOR.
PAUL F. McADAMS
BY Kenneth C. Witt
ATTORNEY

Jan. 21, 1964  P. F. McADAMS  3,118,686
BOUNCE RETARDING VEHICLE SUSPENSION
Filed Dec. 29, 1960  5 Sheets-Sheet 4

INVENTOR.
PAUL F. McADAMS
BY Kenneth C. Witt
ATTORNEY

Jan. 21, 1964   P. F. McADAMS   3,118,686
BOUNCE RETARDING VEHICLE SUSPENSION
Filed Dec. 29, 1960   5 Sheets-Sheet 5

INVENTOR.
PAUL F. McADAMS
BY
Kenneth C. Witt
ATTORNEY

United States Patent Office 3,118,686
Patented Jan. 21, 1964

3,118,686
BOUNCE RETARDING VEHICLE SUSPENSION
Paul F. McAdams, St. Joseph, Mich., assignor to Clark Equipment Company, a corporation of Michigan
Filed Dec. 29, 1960, Ser. No. 79,310
5 Claims. (Cl. 280—65)

This invention relates to vehicles, and more particularly to heavy duty vehicles adapted to carry large loads of earth, rock and other heavy materials.

The present invention is particularly useful in so-called earthmoving scrapers which commonly take the form of articulated four-wheel vehicles having a combined draft and steering coupling between the tractor and trailer portions of the vehicle. However, it will be appreciated that this invention may be applied to other vehicles as well.

Earthmoving scraper vehicles of the type mentioned in the preceding paragraph have been in use for many years and their use is increasing because of their advantages in carrying earth for building highways, dams and other projects involving the movement of large quantities of earth. However, such vehicles have a deficiency which is reflected in two manifestations. The deficiency is that under certain conditions when such vehicles are carrying heavy loads the entire vehicle may go into a rhythmic bouncing action in which the load carrying portion of the vehicle and also the portion in which the operator rides oscillate up and down. Such bouncing action occurs most frequently when the vehicle is traversing rough terrain but it may occur even on relatively smooth paved roads under certain conditions in which one initial bounce apparently sets up a resonant condition which causes the bouncing to continue and increase. Such bouncing action produces a very unpleasant ride for the operator of the vehicle, and, in fact, in some cases it gets so violent that it is difficult for the operator to maintain his place on the vehicle. Another manifestation is that the structural parts of the vehicle may be damaged or fail because of the large shock loads imparted thereto by the bouncing action.

The principal object of the present invention is to provide a structure and system for avoiding or at least minimizing such bouncing operation of load carrying vehicles.

In carrying out my invention in one preferred form, I provide an articulated scraper type vehicle having the front portion of the body supported in part by means of liquid containing devices located between the axle and the frame of the vehicle. The liquid devices are connected to an accumulator whereby liquid may flow from the support devices to the accumulator temporarily under shock load conditions. Flow control devices are provided in the liquid circuit for controlling the liquid flow from and to the liquid support devices.

For a clearer and more complete understanding of my invention reference should be had to the accompanying drawing in which.

Figure 1:
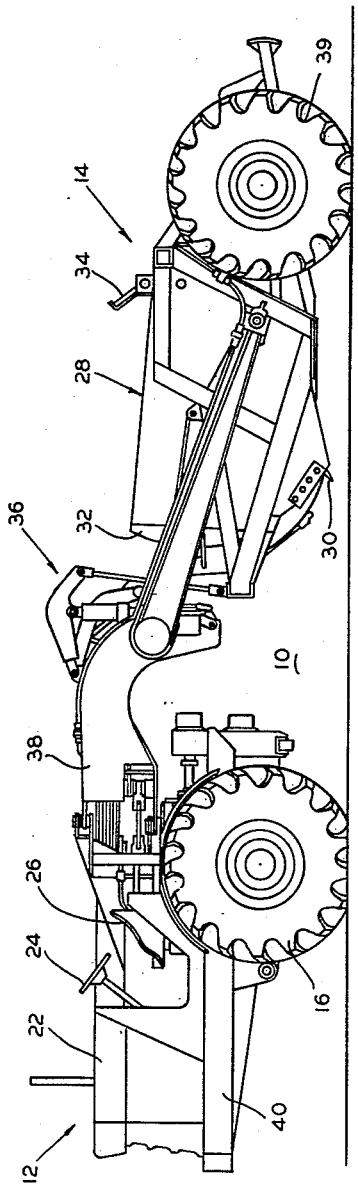
FIGURE 1 is a side elevation of an earthmoving scraper vehicle embodying the present invention.

The numeral 10 in FIG. 1 designates generally an articulated vehicle composed of a two-wheeled tractor portion 12 and a two-wheeled trailer portion 14. The tractor portion 12 includes a pair of rubber-tired wheels 16 (see FIGS. 1 and 2) mounted at the outer ends of a transverse axle 18, an engine or other prime mover 20 (see FIG. 2) within enclosure 22, an operator's station including a steering wheel 24 and a seat 26, and other parts described in greater detail hereinafter.

The trailer portion of the vehicle illustrated is in the form of a scraper for loading, transporting and unloading earth, and includes a main body or bowl portion 28 having a cutting edge 30, an apron 32 for closing the front end of the bowl, an ejector mechanism 34, remotely controlled liquid operated means at 36 for raising and lowering and supporting the front end of the body, and a yoke or a gooseneck portion at 38 for connecting the trailer 14 to the tractor 12. The trailer 14 also includes a pair of rubber-tired wheels 39, only one of which is visible in the drawing, and other parts which it is unnecessary to describe in detail herein.

The tractor 12 includes a main frame 40 which comprises a pair of transversely spaced side members (only one of which is visible in the drawing) interconnected by suitable cross-members. These cross-members include a pair of brace portions 42 and 44 each of which is composed of a pair of transverse plate members connected between the two side members of the frame. I have indicated the plates making up the front brace portion 42 by the identifying numerals 46 and 48 respectively while the two plates making up the rear brace portion 42 are indicated by the numerals 50 and 52 respectively. Connected to and supported by the brace portions 42 and 44 are a pair of annular bearing members 54 and 56 respectively.

A coupling structure 58 is pivotally mounted on the tractor 12 by means of a pair of depending members 60 and 62 which have openings therein for receiving bearing members 54 and 56. This arrangement permits the coupling structure 58 to pivot about a longitudinal horizontal axis on the tractor, and it will be understood by those familiar with articulated vehicles of this type that such pivoting action of the tractor coupling structure is desirable to permit the vehicle to negotiate rough terrain. Tractor coupling structure 58 is connected to yoke 38 of the trailer portion of the vehicle by means of spaced pivot connections at 64 and 68 to provide a combined draft and steering connection between the tractor and trailer. The vehicle is steered by turning the tractor with respect to the trailer about the vertically disposed pivot axis through connection 64 and 68 by suitable power operated means connected between the two portions of the vehicle; and a part of the power operated means is visible at 70.

The vehicle 10 illustrated herein is propelled by means of engine 20 forming a portion of tractor 12 and mounted on frame 40 thereof forwardly of the axle. The engine 20 operates the vehicle through a torque converter 74 which is connected to a change speed transmission 76 aft of the axle by means of a propeller shaft 78. Shaft 78 extends longitudinally through apertures in bearing members 54 and 56. The output of the transmission 76 is connected by a shaft means 79 to a differential mechanism within enclosure 80 which forms a portion of the axle 18 of the tractor. The axle 18 also includes a housing portion 82 which supports the weight of the vehicle and an axle shaft 84 within housing 82 which drives the wheel. There is an axle shaft on each side of the differential connected to its respective wheel.

A portion of the tractor structure just described is disclosed and claimed in my Patent 2,940,533, dated June 14, 1960 which is assigned to the same assignee as the present application. As pointed out in the said patent, the patented construction, because of its location of the various parts of the tractor at positions which afford the optimum weight distribution, is beneficial in providing a vehicle which is easy to maintain and does not unduly strain the various parts of the machine under various operating conditions. Nevertheless, it has been found that under certain circumstances, particularly when a heavy load is being transported and the terrain is rough, that something more is needed to reduce bouncing of the vehicle with the resulting unpleasantness to the operator and possibility of damage to the vehicle.

In order to aid in solving the bouncing problem, I have provided the vehicle described and illustrated herein with two features which make important contributions in this respect. The fluid circuits for such features are shown schematically in FIG. 3 of the drawing.

Figure 2:
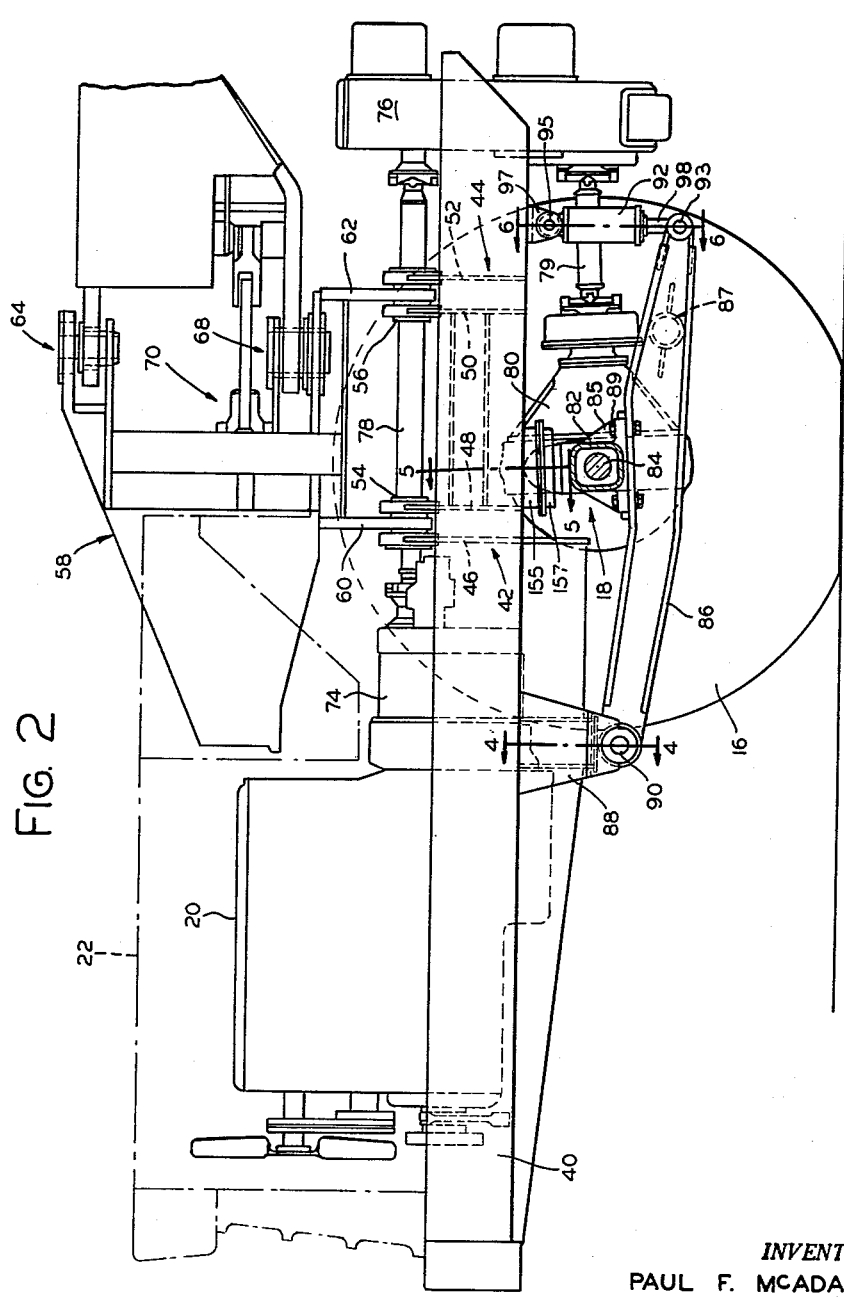
FIGURE 2 is an enlarged side view partially in section of the tractor portion of the vehicle of FIG. 1.
Figure 3:
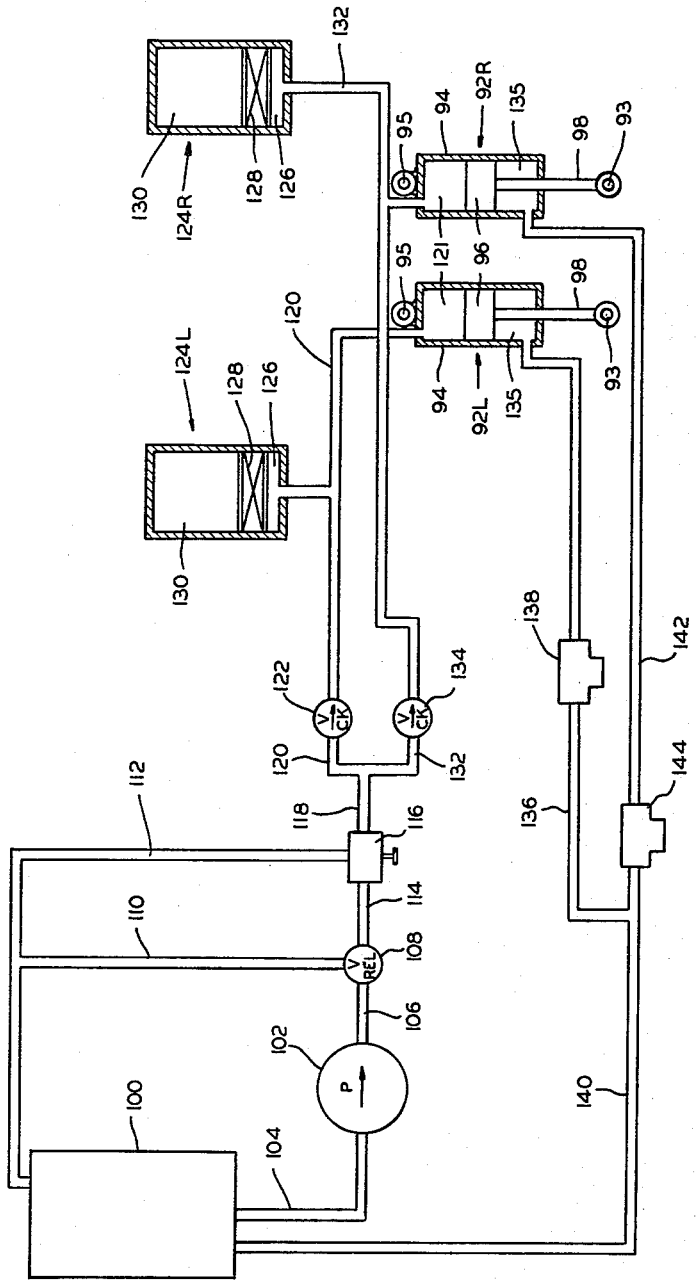
FIGURE 3 is a schematic diagram of the fluid circuit of one embodiment of the invention.

On the tractor, the axle 18 is connected to the frame 40 by means of a structure which includes a pair of struts or lever arms 86 (only one of which is visible in FIG. 2 of the drawing) one on each side of the tractor. Each lever arm 86 is mounted on the bottom of a longitudinal member of frame 40 by means of a depending bracket 88, each lever arm 86 being pivotally connected at 90 to its respective bracket 88. At the rearward end of each lever arm 86 an expansible chamber liquid support device 92 is connected between location 93 on the lever arm and location 95 on another bracket 97 depending from the frame 40. Both of the devices 92 are shown in FIG. 3 where they are indicated as 92L and 92R respectively, and each of them comprises an outer cylinder 94 and a piston 96 operating in the cylinder and connected to the end of a piston rod 98. As shown in FIG. 2, a cross member or brace 87, illustrated herein as a tubular member, extends between the two struts 86, being secured rigidly to both in a suitable manner such as by welding, and this brace and axle 18 combine with struts 86 in providing a strong sub-frame structure which resists lateral movement and also warpage due to the wheels of the vehicle striking holes or obstructions.

Referring again to FIG. 3, the devices 92L and 92R are supplied with oil or other suitable liquid from a reservoir 100. A pump 102 which is preferably operated by the engine 20 of the vehicle in a known manner draws liquid from the reservoir through a conduit 104 and discharges fluid under pressure through conduit 106. From 106 the fluid passes through a relief valve 108 which is merely to provide protection against the occurrence of excessive pressure in the system for any reason, and upon the occurrence of an abnormal or excessive pressure above a predetermined amount this valve discharges fluid back to the reservoir through conduit 110. From valve 108 the pressurized liquid passes through conduit 114 to a pressure regulator mechanism 116 which maintains the pump pressure at a desired amount which may be, for example, 500 lbs. per sq. in., by discharging excess liquid through a conduit 112 to the rservoir. The regulator mechanism 116 is adjustable and under certain conditions discussed in greater detail hereinafter it may be adjusted to hold a lower pressure such as 100 lbs. per sq. in. or some intermediate pressure. From regulator 116 the liquid flows through conduit 118 to a branch conduit 120 and thence through a check valve 122 in this branch conduit which permits liquid flow only in the direction illustrated in FIG. 3 and not in the opposite direction. Conduit 120 directs the liquid to the top chamber 121 of the liquid device 92L above the piston 96 and also to an accumulator indicated by the numeral 124L which may be of any known type. In FIG. 3, accumulator 124L is shown schematically as a piston-type device with fluid from conduit 120 entering the chamber 126 below a piston member 128. The chamber 130 above the piston 128 is filled with a gas such as nitrogen at the desired pressure which in this typical case is 500 lbs. per sq. in.

Pressurized liquid also flows from conduit 118 through branch conduit 132 through a check valve 134 therein to chamber 121 of the other liquid support device 92R and also to another accumulator which is indicated by the character 124R and which is a duplicate of accumulator 124L. The parts of accumulator 124R are indicated by the same identifying numerals as the same parts of 124L.

The bottom chambers of the devices 92, which are identified by the numeral 135, also contain liquid and are in communication with the reservoir 100 through a conduit 140 and branch conduits 136 and 142. A flow control valve 138 is connected in conduit 136 leading from the chamber 135 of device 92L to conduit 140, while a flow control valve 144 is located in conduit 142. Each of the flow control valves provides substantially unlimited flow from reservoir 100 toward the devices 92, while the flow of liquid in the opposite direction from devices 92 back to reservoir 100 is restricted to limit the velocity of such flow, and a typical flow control valve which is suitable for this purpose is disclosed in Patent 2,841,174.

Figure 6:
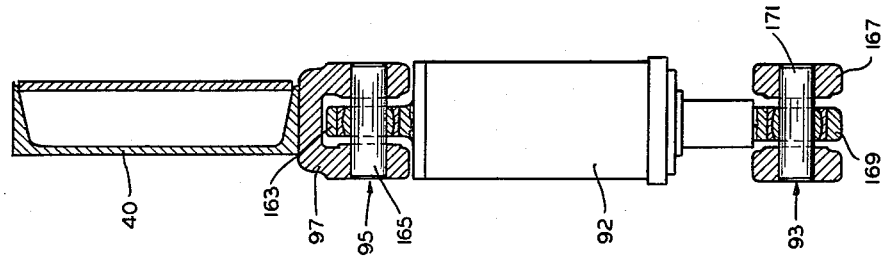
FIGURE 6 is a fragmentary sectional view along the line 6—6 of FIG. 2.
Figure 5:
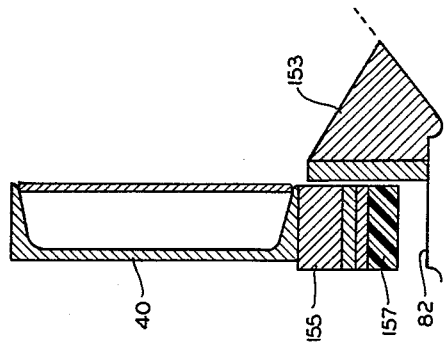
FIGURE 5 is a fragmentary sectional view along the line 5—5 of FIG. 2.
Figure 4:
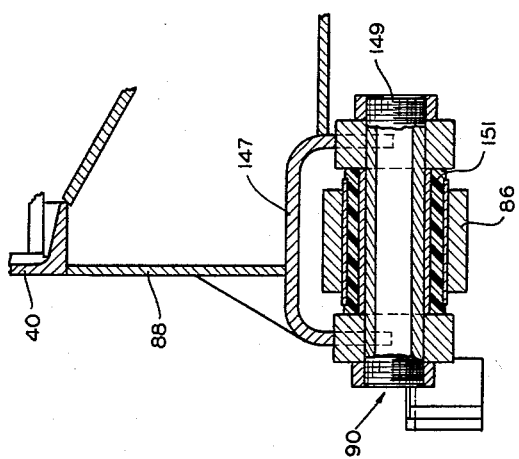
FIGURE 4 is a fragmentary sectional view along the line 4—4 of FIG. 2.

FIGS. 4, 5 and 6 of the drawing show more details of the lever arms 86, the fluid devices 92 and the parts connecting these components with the vehicle. As shown in FIG. 4, the forward pivot connection 90 of arm 86 with bracket 88 includes a bifurcated portion 147 which is secured to and depends from bracket 88. The bifurcated portion 147 is drilled to receive a pin 149. An opening at the forward end of arm 86 receives the pin 149 and a bushing 151 of rubber or other resilient material is positioned between arm 86 and the pin 149 to further assist in absorbing shocks and allowing a limited amount of lateral motion of arm 86 under certain conditions in addition to the pivotal movement of this arm.

FIG. 5 and FIG. 2 show the structure which controls and limits the lateral movement of the arms 86 and the vertical movement of these arms and the axle 18 which is secured thereto. The housing 82 of the axle 18 is secured to the arms 86 at each side of the vehicle by means of brackets 85 which are secured to the axle housing 82 in a suitable manner such as by welding and also secured to the respective lever arms 86 in a suitable manner such as by a plurality of bolts 89. It should be understood that arms 86 and all of the parts illustrated in detail in FIGS. 4, 5 and 6 are also present in allochiral relation on the other side of the vehicle, and that the axle and the brace 87 are secured between the two arms 86. In FIGS. 2 and 5 there is shown a bracket structure 155 secured to the bottom of the longitudinal side member of the frame 40, and a rubber or other resilient block 157 is secured to the bottom of bracket 155 for limiting upward movement of axle 18 toward frame 40. It will be appreciated that after arm 86 moves upward sufficiently to close the space between the top axle housing 82 and resilient block 157, further movement is restricted and ultimately prevented. The axle housing 82 also carries a guide block or projection 153 inwardly of bracket 155 to limit lateral movement of the axle relatively to the frame. The projection 153 illustrated in the drawing prevents movement to the left in FIG. 5, while a corresponding projection on the other side similarly limits movement to the right.

FIG. 6 shows in greater detail the connection of the liquid device 92 with the frame 40 at the top and the arm 86 at the bottom. The connection at the top is made by means of a bifurcated bracket 97 which receives a drilled projection 163 at the top of device 92, a pin 165 extending between these two parts to secure them pivotally together. At the bottom a bifurcation 167 at the rearward end of arm 86 receives a projection 169 at the bottom of device 92 and these two parts are secured by a pin 171.

During transporting operation, the devices 92L and 92R are in condition illustrated in FIG. 3 in which there is considerable liquid in the chamber 121. These chambers are connected through conduits 120 and 132 respectively with accumultaors 124L and 124R. During movement of the loaded vehicle 10 over rough terrain, it tends to bounce because of the great weight of the load carried thereby, such action occurring because of the great stress placed on the structural parts which flexes these parts to a certain extent and in effect causes the vehicle to "bow in the middle." When such flexing becomes cyclic, rhythmic bouncing occurs. With the present invention, when the momentum of the weight of the vehicle body and load is downward the force produced thereby on the liquid in chambers 121 causes liquid to be transferred temporarily from these chambers to the accumulators, temporarily increasing the pressure of the gas in chambers 130. When the abnormal force is dissipated, however, the gas in chambers 130 forces the liquid from the accumulators back into chambers 121. This action provides cushioning for the front of the vehicle which tends to dampen or attenuate the rhythmic bouncing action.

When liquid is discharged from upper chambers 121 as described in the preceding paragraph, additional liquid is drawn into lower chambers 135 from reservoir 100 through conduit 140 and branch conduits 136 and 142. This liquid passes through flow control valves 138 and 144 respectively which provide essentially unrestricted flow in this direction, that is, toward devices 92L and 92R. When the liquid flows from accumulators 124L and 124R back into the chambers 121 upon reversal of the forces on devices 92L and 92R, the liquid in chambers 135 flows back again through the control devices 138 and 144 to the reservoir 100, and in this direction of flow the control devices limit the flow to a predetermined amount. By the use of the flow control devices 138 and 144 it is possible to cause the flow of liquid out of the devices 92L and 92R on the tractor to be at a rate which is found to be the optimum in breaking up the rhythmic bouncing of the vehicle. The flow control devices 138 and 144 may be made adjustable so that it is possible readily to adjust the flow rate to provide for different conditions of operation, and under certain conditions it may be beneficial to adjust flow control devices 138 and 144 so that they provide different rates of return flow for the two sides of the vehicle.

Another way in which this system can be adjusted is to vary the liquid pressure provided by pressure regulator mechanism 116 and in conjunction therewith change the gas pressure in the chambers 130 at the tops of the accumulators to the same value. It will be appreciated that a reduction in these liquid and gas pressures will result in an increase in the rate of flow of the liquid from chambers 121 into the accumulators, while an increase in these pressures will result in a decrease in the rate of liquid flow from chambers 121 to the accumulators. Thus it is possible to regulate the rate of flow out of the chambers 121 in this manner, as well as to regulate the flow back into these chambers by means of the flow control devices 138 and 144.

Figure 7:
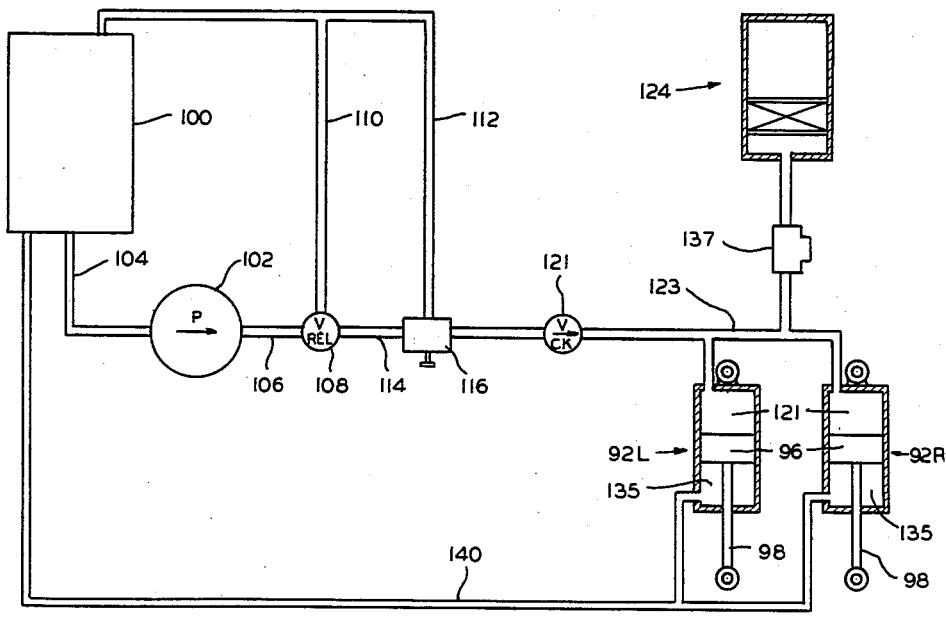
FIGURE 7 is a schematic diagram of a second embodiment of the invention.
Figure 8:
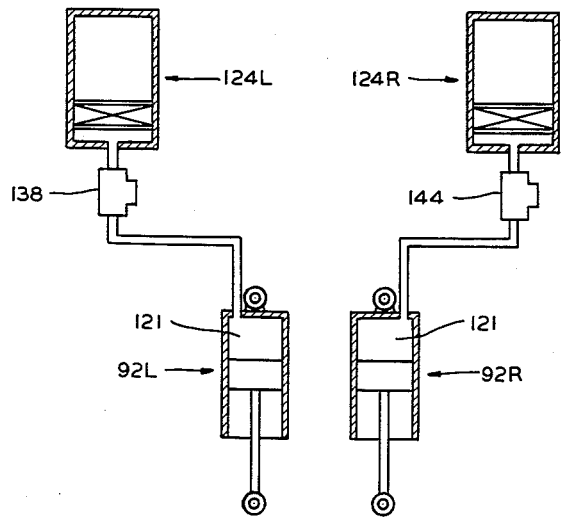
FIGURE 8 is a schematic diagram of a third embodiment of the invention.

FIGS. 7 and 8 of the drawing illustrate two other fluid circuit arrangements which may be employed in this invention, and it will be apparent that still other arrangements may be used without departing from the invention. FIG. 7 illustrates a circuit arrangement which varies from the circuit of FIG. 3 in that a single accumulator, indicated by the numeral 124, is employed jointly for the two liquid devices 92L and 92R. A single flow control valve is utilized in this circuit; this flow control valve, indicated by the numeral 137, is connected between the accumulator 124 and line 123 which in this embodiment supplies both liquid devices from a single check valve 121. The operation of this embodiment of the invention is essentially the same as the first embodiment. When the momentum of the weight of the vehicle body and load is downward the force produced on the liquid in chambers 121 causes liquid to be transferred temporarily from these chambers to the accumulator 124, temporarily increasing the pressure of the gas in chamber 130, the flow control valve 137 permitting unrestricted flow in this direction. When the abnormal force is dissipated, the gas in chamber 130 forces the liquid from the accumulator back into the chambers 121, but the flow control valve 137 limits the velocity of such flow to provide a snubbing or bounce dampening action.

FIG. 8 shows an embodiment which differs from the first embodiment in that the fluid circuit is self-contained, requiring no external connections to a pump or reservoir. It will be appreciated that in the circuit shown in FIG. 3 the pump 102 and pressure regulator 116 serve merely to supply through check valves 122 and 134 sufficient liquid to make up any leakage or other loss from the liquid system comprising chambers 121, the two accumulators and the interconnecting pipes. If this system is adequately sealed to prevent leakage or other loss of liquid, it is not then necessary to maintain the pump, pressure regulator and check valves connected thereto, and FIG. 8 illustrates such an arrangement. In order to eliminate the reservoir completely, the liquid devices 92L and 92R are made single-acting in this embodiment, and the flow control valves 138 and 144 are incorporated in the connections between chambers 121 and 126 of the accumulator. The operation of this circuit in preventing bouncing is the same as the other embodiments, that is, the flow control valves permit rapid flow of liquid from chambers 121 to the accumulators upon the occurrence of a shock load but restrict the rate of return of such liquid to prevent the establishment of a resonant condition which produces bouncing.

While I have described and illustrated herein certain preferred embodiments of my invention it will be apparent to those skilled in the art that modifications may be made. It should be understood, therefore, that I intend to cover by the appended claims all such modifications which fall within the true spirit and scope of my invention.

I claim:

1. A two-wheeled tractor comprising, a longitudinally extending horizontally disposed frame structure having a pair of spaced apart longitudinally extending frame members, a pair of brackets depending from the said frame members, a pair of lever arms pivotally connected respectively to the said brackets and extending rearwardly therefrom beneath the respective frame members in horizontally disposed relation, an axle secured in transverse relation to the said lever arms and adapted to carry wheels at its outer ends, a brace member connected between the said lever arms rearwardly of the said axle, a pair of liquid containing piston and cylinder expansible chamber devices connected in vertically disposed relation between the said two lever arms and their respective frame members, each of the said expansible chamber devices having an upper liquid containing chamber above the piston and a lower liquid containing chamber below the piston, a pair of accumulators, conduit means connecting the said upper chambers to the said two accumulators respectively, means for supplying liquid at a predetermined pressure to the said upper chambers from a reservoir, additional conduit means interconnecting both of the said lower chambers with the said reservoir, and flow control valve means connected in the said additional conduit means, the flow control valve means providing essentially unrestricted flow of liquid from the reservoir to the said lower chambers but limiting to a lower rate the flow of liquid from the lower chambers back to the reservoir, whereby an abnormal load on the tractor causes liquid to be discharged from the upper chambers to the said accumulators and liquid simultaneously to flow from the reservoir to the said lower chambers, and then to return respectively from the accumulators to the upper chambers and from the lower chambers to the reservoir at a slower rate for preventing bouncing action of the tractor.

2. In a vehicle, a horizontally disposed frame structure, bracket means depending from the said frame structure, a pair of horizontally disposed lever arms pivotally connected to the said frame structure and extending rearwardly in spaced relation therebeneath, a transverse axle connected to the said lever arms and carrying wheels at the outer ends thereof, a pair of vertically disposed liquid containing variable chamber devices connected respectively between the free ends of the said lever arms and the said frame structure, each of said variable chamber devices having a movable piston member therein providing an upper chamber above the piston and a lower chamber below the piston, a pair of accumulators, conduit means connecting the said upper chambers respectively to the said accumulators, means including a reservoir, pump, pressure regulator and check valve for supplying liquid to these upper chambers for maintaining a predetermined normal pressure therein, conduit means connecting the said lower chambers to the said reservoir, and a pair of flow control valves connected in the said additional conduit means for controlling the liquid flow respectively from the said lower chambers, each of the said flow control valves providing essentially unrestricted flow of liquid into its respective lower chamber but limiting the flow of liquid out of such chamber to a lower rate.

3. In a vehicle, a horizontally disposed frame structure, bracket means depending from the said frame structure, a pair of horizontally disposed lever arms pivotally connected to the said frame structure and extending rearwardly in spaced relation therebeneath, a transverse axle connected to the said lever arms and carrying wheels at the outer ends thereof, a pair of vertically disposed liquid containing variable chamber devices connected respectively between the free ends of the said lever arms and the said frame structure, each of the variable chamber liquid devices having a movable piston member therein providing an upper chamber and a lower chamber, an accumulator, first fluid conduit means interconnecting both of the said upper chambers with the said accumulator, a flow control valve in the said first conduit means providing substantially unrestricted flow from the upper chambers into the said accumulator but restricting the flow from the accumulator back to the said upper chambers to a lower rate, means including a reservoir, pump, pressure regulator, and check valve for maintaining a predetermined normal pressure in the said upper chambers, and additional conduit means interconnecting the said lower chambers with the said reservoir.

4. In a vehicle, a horizontally disposed frame structure, bracket means depending from the said frame structure, a pair of horizontally disposed lever arms pivotally connected to the said frame structure and extending rearwardly in spaced relation therebeneath, a transverse axle connected to the said lever arms and carrying wheels at the outer ends thereof, a pair of vertically disposed liquid containing variable chamber devices connected respectively between the free ends of the said lever arms and the said frame structure, each of the variable chamber liquid devices having a movable piston member therein providing an upper chamber and a lower chamber, a pair of accumulators, a pair of conduits interconnecting the said accumulators respectively with the said upper chambers, and a pair of flow control valves located respectively in the said conduits and providing substantially unrestricted flow of liquid from the said upper chambers to the said accumulators respectively but restricting flow of liquid from the accumulators back to the said upper chambers to a lower rate.

5. A two-wheeled tractor comprising, a longitudinally extending horizontally disposed frame structure having a pair of spaced apart longitudinally extending frame members, a pair of brackets depending from the said frame members respectively, a pair of lever arms pivotally connected respectively to the said brackets and extending rearwardly therefrom beneath the respective frame members in horizontally disposed relation, the connections between the said lever arms and the said brackets providing for both vertical and lateral movement of the lever arms, a transversely extending axle housing fixedly secured to each of the said lever arms approximately centrally thereof, a pair of wheels carried respectively at the outer ends of the said axle housing, a brace member fixedly connected between the said lever arms rearwardly of the said axle housing, a pair of upwardly extending projections on the said axle housing located inwardly of the respective frame members and arranged to limit lateral movement of the lever arms and the axle housing by abutting the frame member, a pair of liquid containing expansible chamber devices connected respectively between the free ends of the said lever arms and the respective frame members by means which allow relative lateral movement between such free ends and the frame structure, and means for temporarily discharging part of the liquid from the said expansible chamber devices to cushion relative movement of the said frame members and the lever arms toward each other.

References Cited in the file of this patent

UNITED STATES PATENTS

| | | |
|---|---|---|
| 2,644,699 | Weiertz | July 7, 1953 |
| 2,827,282 | Weiss | Mar. 18, 1958 |
| 2,848,248 | Hansen | Aug. 19, 1958 |
| 2,859,047 | Easton | Nov. 4, 1958 |
| 2,865,652 | Easton | Dec. 23, 1958 |
| 2,957,702 | Heiss | Oct. 25, 1960 |